(12) United States Patent
Nagashima

(10) Patent No.: US 12,480,456 B2
(45) Date of Patent: Nov. 25, 2025

(54) CONTROLLER FOR INTERNAL COMBUSTION ENGINE

(71) Applicant: TOYOTA JIDOSHA KABUSHIKI KAISHA, Toyota (JP)

(72) Inventor: Tatsuhiko Nagashima, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/939,519

(22) Filed: Nov. 7, 2024

(65) Prior Publication Data

US 2025/0188885 A1    Jun. 12, 2025

(30) Foreign Application Priority Data

Dec. 11, 2023 (JP) ................................. 2023-208578

(51) Int. Cl.
| | | |
|---|---|---|
| F02D 41/04 | (2006.01) | |
| F02D 41/14 | (2006.01) | |
| F02D 41/38 | (2006.01) | |

(52) U.S. Cl.
CPC ......... *F02D 41/38* (2013.01); *F02D 41/1454* (2013.01); *F02D 2200/1002* (2013.01); *F02D 2200/101* (2013.01)

(58) Field of Classification Search
CPC .. F02D 35/024; F02D 2041/147; F02D 41/38; F02D 41/1454; F02D 41/1458; F02D 2250/08; F01M 13/00; F01M 13/0011
See application file for complete search history.

(56) References Cited

U.S. PATENT DOCUMENTS

| | | | | |
|---|---|---|---|---|
| 2012/0316756 A1* | 12/2012 | Tsuyuki | .............. | F02D 13/0261 701/104 |
| 2014/0053803 A1* | 2/2014 | Rayl | ...................... | F02D 37/02 123/350 |
| 2015/0051811 A1* | 2/2015 | Song | .................... | F02D 41/2474 701/104 |
| 2017/0152777 A1* | 6/2017 | Kashiwabara | ...... | F02D 41/0025 |

FOREIGN PATENT DOCUMENTS

| | | | | |
|---|---|---|---|---|
| JP | 2013256939 A | * 12/2013 | | |
| JP | 2015-137547 A | 7/2015 | | |
| WO | WO-2017078483 A1 | * 5/2017 | ............... | F16K 3/02 |

* cited by examiner

*Primary Examiner* — George C Jin
*Assistant Examiner* — Teuta B Holbrook

(57) ABSTRACT

A controller for an internal combustion engine acquires a rotation speed, a load factor, and a current torque from sensors mounted on a vehicle. The controller calculates a predicted torque and a predicted blow-by gas amount based on the rotation speed and the load factor. The controller calculates an estimated richness ratio indicating a ratio at which an air-fuel mixture in a combustion chamber has been enriched by blow-by gas, based on the predicted blow-by gas amount and a difference between the current torque and the predicted torque. The controller corrects a fuel injection amount of the fuel injection valve based on the estimated richness ratio.

5 Claims, 3 Drawing Sheets

CONTROLLER FOR INTERNAL COMBUSTION ENGINE

CROSS-REFERENCE TO RELATED APPLICATIONS

This application is based upon and claims the benefit of priority from prior Japanese Patent Application No. 2023-208578, filed on Dec. 11, 2023, the entire contents of which are incorporated herein by reference.

BACKGROUND

1. Field

The present disclosure relates to a controller for an internal combustion engine.

2. Description of Related Art

Japanese Laid-Open Patent Publication No. 2015-137547 discloses a controller that corrects a fuel injection amount of an internal combustion engine based on an air-fuel ratio detected by an air-fuel ratio sensor.

When the amount of fuel in blow-by gas increases, the air-fuel ratio becomes rich and the torque increases. However, an internal combustion engine that uses hydrogen as fuel does not include an air-fuel ratio sensor. The fuel injection amount thus cannot be corrected based on the air-fuel ratio. Therefore, excessive fuel supply caused by the addition of fuel from blow-by gas raises concerns about deterioration of drivability, increases in noise and vibration, occurrences of pre-ignition, and/or worsened emissions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine is provided. The internal combustion engine is a hydrogen engine that is mounted on a vehicle and uses hydrogen as fuel. The controller includes processing circuitry configured to perform acquiring a rotation speed, a load factor, and a current torque of the internal combustion engine from sensors mounted on the vehicle, calculating a predicted torque and a predicted blow-by gas amount based on the rotation speed and the load factor, calculating an estimated richness ratio indicating a ratio at which an air-fuel mixture in a combustion chamber has been enriched by blow-by gas, based on the predicted blow-by gas amount and a difference between the current torque and the predicted torque, and correcting a fuel injection amount of the fuel injection valve based on the estimated richness ratio.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller for an internal combustion engine according to an embodiment will now be described with reference to FIGS. 1 to 3.

Configuration of Internal Combustion Engine

Figure 1:
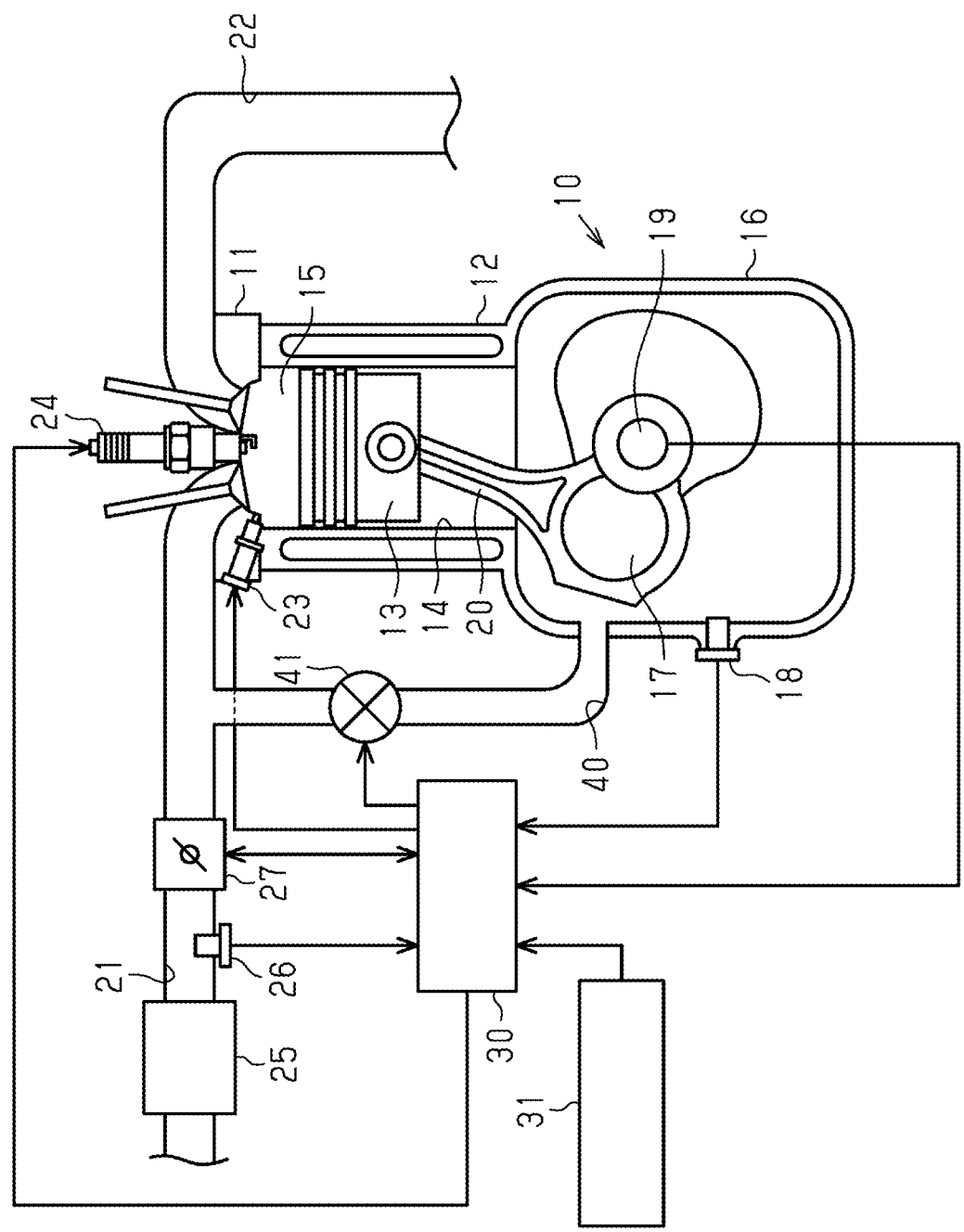
FIG. 1 is a schematic diagram of a controller for an internal combustion engine according to an embodiment.

FIG. 1 schematically shows an internal combustion engine 10 mounted on a vehicle. The internal combustion engine 10 shown in FIG. 1 is a hydrogen engine that uses hydrogen as fuel.

As shown in FIG. 1, the internal combustion engine 10 includes a cylinder head 11, a cylinder block 12, and a piston 13. The cylinder block 12 includes a cylinder 14. In the cylinder 14, a combustion chamber 15 for burning hydrogen is formed above the piston 13. A lower portion of the cylinder block 12 forms a crankcase 16. The crankcase 16 is provided with a crankshaft 17, a crank angle sensor 18, and a torque sensor 19. A connecting rod 20 connects the piston 13 and the crankshaft 17. The connecting rod 20 transmits the movement of the piston 13 to the crankshaft 17.

The internal combustion engine 10 includes an intake passage 21 through which intake air introduced into the combustion chamber 15 passes, and an exhaust passage 22 through which exhaust gas discharged from the combustion chamber 15 passes. Further, the internal combustion engine 10 includes a fuel injection valve 23 and an ignition plug 24. The fuel injection valve 23 injects hydrogen as fuel into the intake air to form an air-fuel mixture. The ignition plug 24 ignites the air-fuel mixture in the combustion chamber 15 by spark discharge. The intake passage 21 is provided with an air cleaner 25 that filters dust and the like in the air. The intake passage 21 is provided with an air flow meter 26 and a throttle valve 27. The throttle valve 27 adjusts the amount of intake air introduced into the combustion chamber 15 in accordance with the opening degree of the throttle valve 27. Exhaust gas generated by the combustion of the air-fuel mixture in the combustion chamber 15 is discharged to the exhaust passage 22.

Configuration of Controller 30

The controller 30 includes processing circuitry including one or more memories that store programs required for controlling the internal combustion engine 10, and one or more processors that execute various processes in accordance with the programs stored in the one or more memories. The processing circuitry may include one or more dedicated hardware circuits such as an application-specific integrated circuit (ASIC) that executes at least a part of various processes. Alternatively, the processing circuitry may include a combination of one or more processors and one or more dedicated hardware circuits. The memory may include a RAM, a ROM, and the like. The memories, or computer readable media, include any type of media that are accessible by general-purpose computers and dedicated computers.

Detection signals of various sensors for detecting the operating state of the internal combustion engine 10 are input to the controller 30. The various sensors include a crank angle sensor 18, a torque sensor 19, an air flow meter 26, and a vehicle speed sensor 31. The crank angle sensor 18 detects a crank angle of the internal combustion engine 10. The torque sensor 19 detects the magnitude of the torque generated by the internal combustion engine 10. An example of the torque sensor 19 is a motor generator in a hybrid vehicle. The air flow meter 26 detects an intake air flow rate. The vehicle speed sensor 31 detects a vehicle speed.

Circulation of Blow-By Gas

The circulation of the blow-by gas will be described. Not all of the fuel in the combustion chamber 15 is combusted, and a portion of the fuel in the combustion chamber 15 leaks into the crankcase 16 from between the inner wall of the cylinder 14 and the piston 13. A PCV passage 40 connects the crankcase 16 and the intake passage 21 in order to reuse unburned fuel that has leaked into the crankcase 16. A PCV valve 41 is provided in the PCV passage 40. The controller 30 issues an instruction to the PCV valve 41 to control the amount of blow-by gas supplied from the crankcase 16 to the intake passage 21.

Control of Fuel Injection Amount by Controller 30

The control of the fuel injection amount executed by the controller 30 will be described. The rotation speed of the crankshaft 17 based on the detection signal of the crank angle sensor 18 is defined as the rotation speed of the internal combustion engine 10. The ratio of the current intake air flow rate to the intake air flow rate when the internal combustion engine 10 is steadily operated in the full-load state is defined as the load factor of the internal combustion engine 10. When controlling the fuel injection amount, the controller 30 determines a target torque based on the rotation speed, the load factor, and the like of the internal combustion engine 10.

The controller 30 determines an air excess ratio λ required for realizing the target torque based on the target torque and the rotation speed. The air excess ratio λ is determined to be a value within a certain range using a calculation map in which the target torque and the rotation speed are input variables. For example, the air excess ratio λ determined using the calculation map is a value in a range between 3.0 and 1.5. As the target torque increases, the air excess ratio λ is set to a smaller value.

The controller 30 determines the fuel injection amount in accordance with the intake air flow rate so that the determined air excess ratio λ is realized. The controller 30 causes the fuel injection valve 23 to inject hydrogen by controlling the fuel injection valve 23 based on the determined fuel injection amount.

Processes Executed by Controller 30

Figure 2:
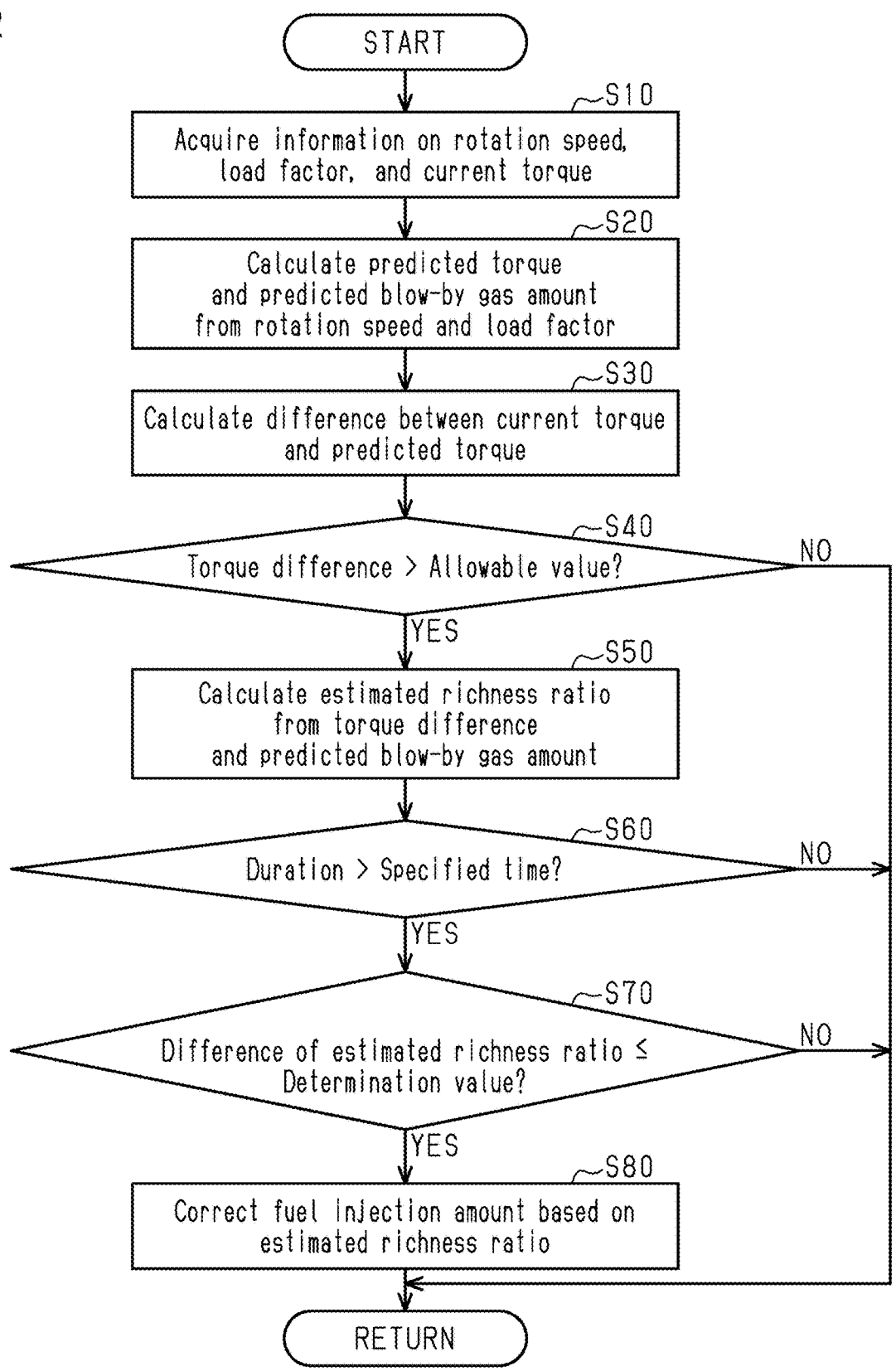
FIG. 2 is a flowchart of a correction process of a fuel injection amount executed by the controller shown in FIG. 1.

FIG. 2 shows the flow of a series of processes executed by the controller 30 regarding correction of the fuel injection amount. This series of processes is repeatedly executed by the controller 30 during operation of the internal combustion engine 10.

In the process of step S10, the controller 30 acquires information on the rotation speed, the load factor, and the current torque.

In the process of step S20, the controller 30 calculates a predicted torque and a predicted blow-by gas amount based on the acquired rotation speed and load factor. In the present embodiment, the predicted torque and the target torque have the same value.

In the process of step S30, the controller 30 calculates the difference between the current torque and the predicted torque. The calculated difference is obtained by subtracting the predicted torque from the current torque.

In the process of step S40, the controller 30 compares the magnitude of the calculated torque difference with a preset allowable value. As a result of the comparison, when the torque difference is greater than the allowable value (step S40: YES), the controller 30 advances the process to step S50. When the torque difference is less than or equal to the allowable value (step S40: NO), the controller 30 temporarily ends the series of processes.

Figure 3:
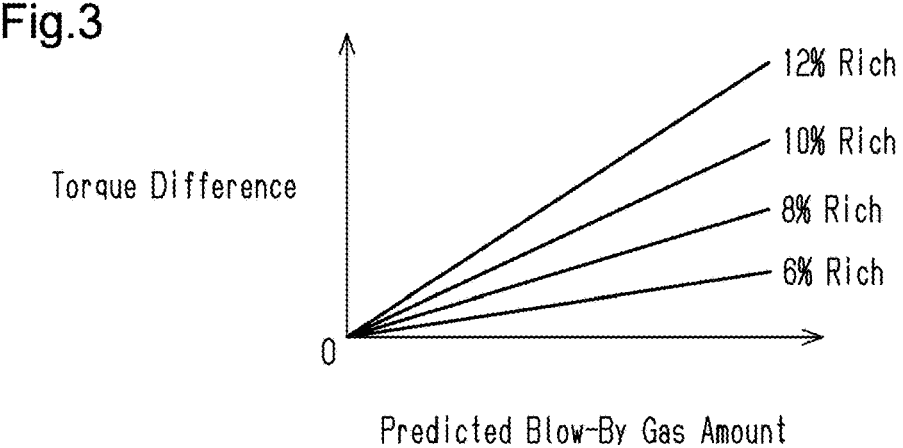
FIG. 3 is a graph showing a relationship among a torque difference, a predicted blow-by gas amount, and an estimated richness ratio.

In the process of step S50, the controller 30 calculates an estimated richness ratio from the torque difference and the predicted blow-by gas amount as shown in FIG. 3. The estimated richness ratio is an index showing the ratio of the amount of fuel present in the combustion chamber 15 to the amount of fuel injected from the fuel injection valve 23. The relationship among the torque difference, the predicted blow-by gas amount, and the estimated richness ratio as shown in FIG. 3 can be identified, for example, based on the results of experiments.

In the process of step S60, the controller 30 compares a duration with a specified time. The duration is a time during which a state in which there is a difference between the current torque and the predicted torque continues. As a result of the comparison, when the duration is longer than the specified time (step S60: YES), the controller 30 advances the process to step S70. When the duration is less than or equal to the specified time (step S60: NO), the controller 30 temporarily ends the series of processes.

In the process of step S70, the controller 30 compares the estimated richness ratio calculated in the process of step S50 with an estimated richness ratio calculated in a different operating state. The different operating state refers to a state in which the rotation speed and the load factor are different from the rotation speed and the load factor acquired in step S10. That is, the estimated richness ratio calculated in the process of step S50 is referred to as a first estimated richness ratio calculated in a first operating state of the internal combustion engine 10. In the process of step S70, the first estimated richness ratio is compared with a second estimated richness ratio, which has been calculated in a second operating state different from the first operating state. As a result of the comparison, when the difference between the two estimated richness ratios is less than or equal to a determination value (step S70: YES), the controller 30 advances the process to step S80. When the difference between the two estimated richness ratios exceeds the determination value (step S70: NO), the controller 30 temporarily ends the series of processes.

In the process of step S80, the controller 30 corrects the fuel injection amount based on the estimated richness ratio calculated in step S50. At this time, due to the influence of the blow-by gas, the amount of fuel contained in the air-fuel mixture in the combustion chamber 15 is greater than the amount of fuel injected from the fuel injection valve 23, and the air-fuel mixture has been enriched. Therefore, the controller 30 reduces the fuel injection amount through correction. The controller 30 determines the correction amount such that the fuel injection amount is decreased as the estimated richness ratio increases. The process ends the series of processes executed by the controller 30.

Operation of Present Embodiment

The controller 30 controls the fuel injection amount as part of the control of the internal combustion engine 10, which is a hydrogen engine. The controller 30 acquires the operating state of the internal combustion engine 10 from one or more sensors mounted in the vehicle (step S10). The controller 30 calculates an estimated richness ratio based on the acquired operating state (step S50). The controller 30 corrects the fuel injection amount based on the calculated estimated richness ratio (step S80).

Advantages of Present Embodiment (1) The controller 30 corrects the fuel injection amount based on the estimated richness ratio calculated from the operating state of the internal combustion engine 10. Therefore, in the internal combustion engine 10 which is a hydrogen engine, the fuel injection amount can be corrected without using an air-fuel ratio sensor.

(2) By correcting the fuel injection amount, the controller 30 can suppress deterioration of drivability, an increase in sound volume and vibration, occurrence of pre-ignition, and/or deterioration of emission, which may be caused by excessive fuel supply due to addition of fuel derived from blow-by gas.

(3) The current torque becomes greater than the predicted torque due to the influence of the blow-by gas. In order to constantly eliminate the difference between the predicted torque and the current torque, the controller 30 needs to constantly calculate the estimated richness ratio and constantly correct the fuel injection amount.

The controller 30 calculates the estimated richness ratio on condition that the difference between the current torque and the predicted torque is greater than the allowable value.

According to the above embodiment, when the difference between the current torque and the predicted torque is less than or equal to the set allowable value, the controller 30 allows the torque difference. The controller 30 does not calculate the estimated richness ratio when the torque difference is small enough to be allowed. Due to this, it is possible to keep the frequency of calculation of the estimated richness ratio by the controller 30 from becoming excessive.

(4) The controller 30 corrects the fuel injection amount of the fuel injection valve 23 based on the estimated richness ratio on the condition that the difference between the current torque and the predicted torque is greater than the allowable value. The controller 30 does not correct the fuel injection amount when the torque difference is small enough to be allowed. Thus, it is possible to prevent the number of corrections of the fuel injection amount by the controller 30 from becoming excessive.

(5) When the operating state of the internal combustion engine 10 varies while the vehicle is traveling, a temporary difference may occur between the current torque and the predicted torque due to the variation in the operating state. The temporarily generated torque difference may be eliminated without correcting the fuel injection amount. The controller 30 corrects the fuel injection amount on condition that a time during which there is a difference between the current torque and the predicted torque continues is longer than a specified time.

According to the above-described embodiment, the controller 30 allows a state in which there is a difference between the current torque and the predicted torque when the duration is less than the specified time. The controller 30 does not correct the fuel injection amount when there is a temporary torque difference. Therefore, it is possible to prevent the number of times of the correction control of the fuel injection amount by the controller 30 from becoming excessive.

(6) The controller 30 corrects the fuel injection amount based on the estimated richness ratio on condition that the difference between the estimated richness ratios calculated in the different operating states is less than or equal to the determination value.

The ratio of the amount of fuel in the blow-by gas does not fluctuate greatly in a short time. Therefore, when the air-fuel mixture is enriched by the fuel derived from the blow-by gas, the estimated richness ratio calculated by the controller 30 does not greatly fluctuate even if the operating state of the internal combustion engine 10 changes.

According to the above embodiment, the correction of the fuel injection amount based on the estimated richness ratio is performed based on the fact that the difference between the two estimated richness ratios calculated in the different operating states is small. Therefore, when the air-fuel mixture is enriched by the fuel derived from the blow-by gas, the controller 30 can appropriately control the fuel injection amount by correcting the fuel injection amount based on the estimated richness ratio.

Modifications

The following are modifications commonly applicable to the above-described embodiments. The following modifications can be combined as long as the combined modifications remain technically consistent with each other.

The controller 30 corrects the fuel injection amount based on the estimated richness ratio on condition that the duration is longer than a specified time (step S60) and on condition that a difference between two estimated richness ratios calculated in different operating states is less than or equal to a determination value (step S70). As opposed to this, the controller 30 may correct the fuel injection amount based on the estimated richness ratio, regardless of whether or not the duration is longer than the specified time, and regardless of whether or not the difference between the two estimated richness ratios calculated in different operating states is the determination value or less. That is, the processes of steps S60 and S70 may be omitted from the series of processes shown in FIG. 2. A series of processes executed by the controller 30 will be described with reference to FIG. 4.

Figure 4:
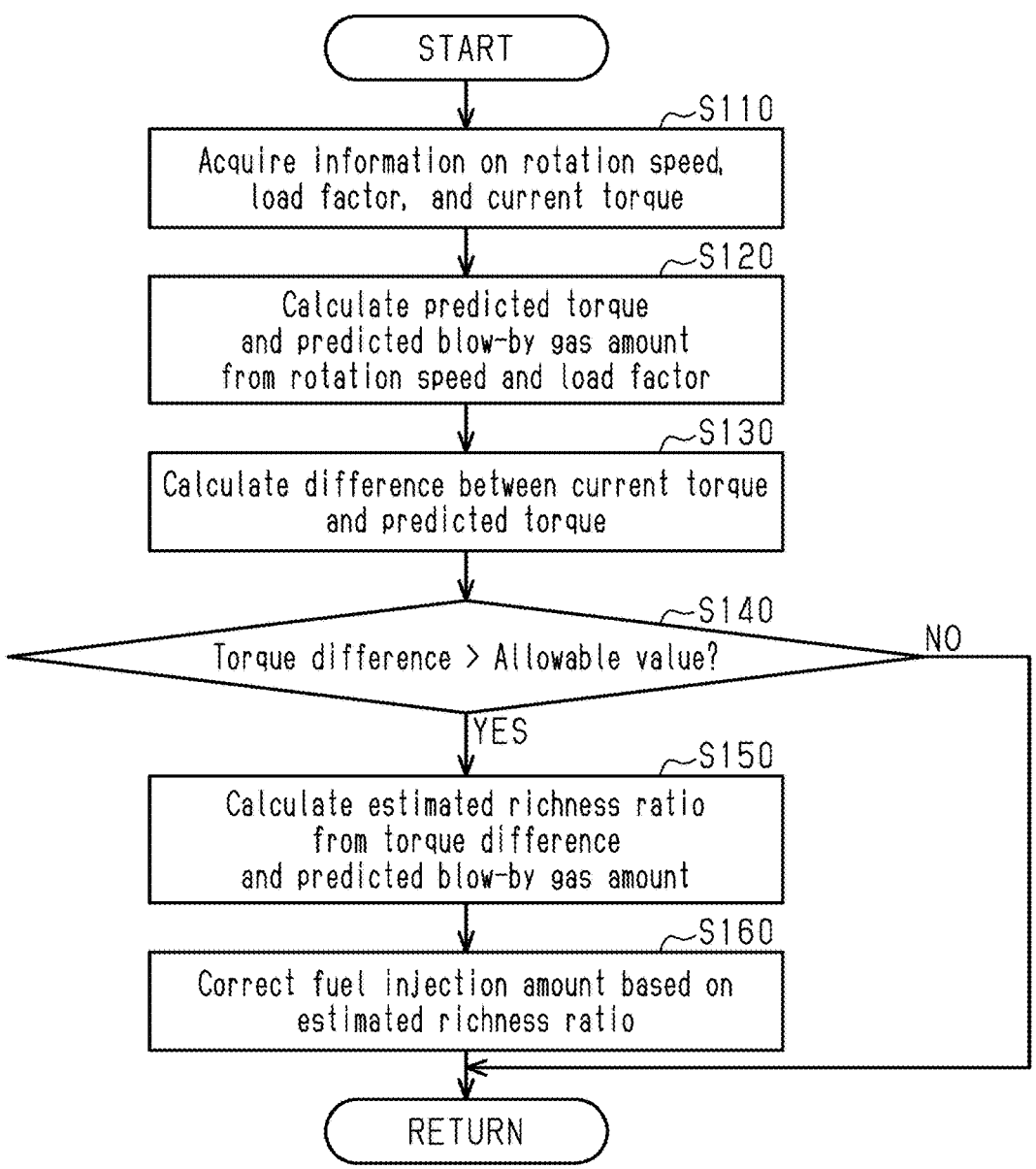
FIG. 4 is a flowchart of a correction process of a fuel injection amount according to another embodiment.

FIG. 4 shows a flow of a series of processes executed by the controller 30 for correction of the fuel injection amount. This series of processes is repeatedly executed by the controller 30 during operation of the internal combustion engine 10.

In the process of step S110, the controller 30 acquires information on the rotation speed, the load factor, and the current torque.

In the process of step S120, the controller 30 calculates the predicted torque and the predicted blow-by gas amount based on the acquired rotation speed and load factor. In the present embodiment, the predicted torque and the target torque have the same value.

In the process of step S130, the controller 30 calculates the difference between the current torque and the predicted torque. The calculated difference is obtained by subtracting the predicted torque from the current torque.

In the process of step S140, the controller 30 compares the magnitude of the calculated torque difference with a preset allowable value. As a result of the comparison, when the torque difference is greater than the allowable value (step S140: YES), the controller 30 advances the process to step S150. When the torque difference is less than or equal to the allowable value (step S140: NO), the controller 30 temporarily ends the series of processes.

In the process of step S150, the controller 30 calculates an estimated richness ratio from the torque difference and the predicted blow-by gas amount as shown in FIG. 3.

In the process of step S160, the controller 30 corrects the fuel injection amount based on the estimated richness ratio calculated in step S150.

Such a controller 30 can achieve the same advantages as the advantages (1), (2), and (4) described in the advantages of the above embodiment.

The controller 30 calculates the estimated richness ratio on condition that the difference between the current torque and the predicted torque is greater than the allowable value (step S40). However, the controller 30 may calculate the estimated richness ratio regardless of whether or not the difference between the current torque and the predicted torque is greater than the allowable value. That is, the process of step S40 may be omitted from the series of processes shown in FIG. 2. Such a controller 30 can achieve the same advantages as the advantages (1), (2), (5), and (6) described in the advantages of the embodiment.

The controller 30 corrects the fuel injection amount based on the estimated richness ratio on condition that the difference between the current torque and the predicted torque is greater than the allowable value (step S140). However, the controller 30 may correct the fuel injection amount based on the estimated richness ratio regardless of whether or not the difference between the current torque and the predicted torque is greater than the allowable value. That is, the process of step S140 may be omitted from the series of processes shown in FIG. 4. Such a controller 30 can achieve the same advantages as the advantages (1) and (2) described in the advantages of the embodiment.

The controller 30 corrects the fuel injection amount based on the estimated richness ratio on condition that the duration is longer than the specified time (step S60). However, the controller 30 may correct the fuel injection amount based on the estimated richness ratio regardless of whether or not the duration is longer than the specified time. That is, the process of step S60 may be omitted from the series of processes shown in FIG. 2. Such a controller 30 can achieve the same advantages as the advantages (1), (2), (3), and (6) described in the advantages of the embodiment.

The controller 30 corrects the fuel injection amount based on the estimated richness ratio on condition that the difference between the two estimated richness ratios calculated in the different operating states is less than or equal to the determination value (step S70). As opposed to this, the controller 30 may correct the fuel injection amount based on the estimated richness ratio, regardless of whether the difference between the two estimated richness ratios calculated in different operating states is the determination value or less. That is, the process of step S70 may be omitted from the series of processes shown in FIG. 2. The controller 30 can achieve the same advantages as the advantages (1), (2), (3), and (5) described in the advantages of the above-described embodiment.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine being a hydrogen engine that is mounted on a vehicle and uses hydrogen as fuel, the controller comprising processing circuitry configured to perform:

acquiring a rotation speed, a load factor, and a current torque of the internal combustion engine from sensors mounted on the vehicle;

calculating a predicted torque and a predicted blow-by gas amount based on the rotation speed and the load factor;

calculating an estimated richness ratio indicating a ratio at which an air-fuel mixture in a combustion chamber has been enriched by blow-by gas, based on the predicted blow-by gas amount and a difference between the current torque and the predicted torque; and correcting a fuel injection amount of the fuel injection valve based on the estimated richness ratio.

2. The controller according to claim 1, wherein the processing circuitry is configured to calculate the estimated richness ratio on condition that the difference between the current torque and the predicted torque is greater than an allowable value.

3. The controller according to claim 1, wherein the processing circuitry is configured to correct the fuel injection amount based on the estimated richness ratio on condition that the difference between the current torque and the predicted torque is greater than an allowable value.

4. The controller according to claim 1, wherein the processing circuitry is configured to correct the fuel injection amount based on the estimated richness ratio on condition that a time during which a state in which there is a difference between the current torque and the predicted torque continues is longer than a specified time.

5. The controller according to claim 1, wherein
the estimated richness ratio is a first estimated richness ratio that is calculated in a first operating state of the internal combustion engine, and
the processing circuitry is configured to correct the fuel injection amount based on the first estimated richness ratio on condition that a difference between the first estimated richness ratio and a second estimated richness ratio is less than or equal to a determination value, the second estimated richness ratio being calculated in a second operating state different from the first operating state.

\* \* \* \* \*